(12) United States Patent
Deng et al.

(10) Patent No.: US 11,435,057 B2
(45) Date of Patent: Sep. 6, 2022

(54) ZOOM STRUCTURE, LAMP HOLDER AND LENS

(71) Applicant: OPPLE LIGHTING CO., LTD., Shanghai (CN)

(72) Inventors: Shitao Deng, Shanghai (CN); Yueping Wang, Shanghai (CN); Xuejun Feng, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 17/138,721

(22) Filed: Dec. 30, 2020

(65) Prior Publication Data

US 2021/0116100 A1   Apr. 22, 2021

Related U.S. Application Data

(63) Continuation of application No. PCT/CN2019/097134, filed on Jul. 22, 2019.

(30) Foreign Application Priority Data

Jul. 27, 2018 (CN) .......................... 201821210672.5

(51) Int. Cl.
*F21V 5/00* (2018.01)
*F21V 5/04* (2006.01)
(Continued)

(52) U.S. Cl.
CPC ................ *F21V 5/04* (2013.01); *F21V 14/06* (2013.01); *F21V 29/70* (2015.01); *G02B 7/04* (2013.01)

(58) Field of Classification Search
CPC . F21V 5/04; F21V 29/70; F21V 14/06; G02B 7/04
See application file for complete search history.

(56) References Cited

U.S. PATENT DOCUMENTS

| 10,041,651 | B1* | 8/2018 | Xi | ........................... F21V 14/04 |
| 2008/0019027 | A1* | 1/2008 | Lin | ........................ G02B 7/021 |
| | | | | 359/825 |

(Continued)

FOREIGN PATENT DOCUMENTS

| CN | 201513729 U | 6/2010 |
| CN | 202082822 U | 12/2011 |

(Continued)

OTHER PUBLICATIONS

International Search Report of PCT Application No. PCT/CN2019/097134 dated Oct. 28, 2019 with English translation, (5p).

*Primary Examiner* — Gerald J Sufleta, II
(74) *Attorney, Agent, or Firm* — Arch & Lake LLP

(57) ABSTRACT

A zoom structure includes a light source, a first sleeve, a second sleeve, a lens fixedly connected with the first sleeve and a limitation element. The second sleeve and the first sleeve are coaxially arranged, the second sleeve is rotationally connected with the limitation element in a circumferential direction. The second sleeve is provided with a plurality of spiral sliding grooves. The first sleeve is provided with a plurality of sliding structures connected with the spiral sliding grooves. A position of the light source module is fixed. The lens is opposite to the light source module in the axial direction. The second sleeve is rotatable relative to the limitation element in the circumferential direction. The spiral sliding grooves push the sliding structures to move on the limitation element in the axial direction, the sliding structures then drive the first sleeve and the lens to move in the axial direction.

13 Claims, 4 Drawing Sheets

(51) Int. Cl.
*F21V 29/70* (2015.01)
*F21V 14/06* (2006.01)
*G02B 7/04* (2021.01)

(56) References Cited

U.S. PATENT DOCUMENTS

| | | | | |
|---|---|---|---|---|
| 2013/0294099 A1* | 11/2013 | Hsieh | ........................ | F21S 6/008 |
| | | | | 362/430 |
| 2017/0363275 A1* | 12/2017 | Hung | ........................ | F21V 23/06 |
| 2018/0080634 A1* | 3/2018 | Huang | ........................ | F21V 14/06 |
| 2018/0106471 A1* | 4/2018 | Gao | ........................ | F21V 5/04 |
| 2019/0093861 A1* | 3/2019 | Xu | ........................ | F21V 14/06 |
| 2019/0120443 A1* | 4/2019 | Xia | ........................ | F21S 6/003 |
| 2020/0173630 A1* | 6/2020 | Zhang | ........................ | F21V 3/02 |

FOREIGN PATENT DOCUMENTS

| | | | |
|---|---|---|---|
| CN | 202647604 U | | 1/2013 |
| CN | 104033848 A | | 9/2014 |
| CN | 207635166 U | * | 7/2018 |
| CN | 207635166 U | | 7/2018 |
| CN | 208475253 U | | 2/2019 |

* cited by examiner

US 11,435,057 B2

ZOOM STRUCTURE, LAMP HOLDER AND LENS

CROSS-REFERENCE TO RELATED APPLICATIONS

This application is based upon and claims the priority of PCT patent application No. PCT/CN2019/097134 filed on Jul. 22, 2019 which claims priority to the Chinese patent application No. 201821210672.5 filed on Jul. 27, 2018, the entire content of all of which is hereby incorporated by reference herein for all purposes.

TECHNICAL FIELD

The disclosure belongs to the technical field of lighting, and particularly relates to a zoom structure, a lamp holder, and a lighting device.

BACKGROUND

For table lamps on the current market, the distance between lenses and light sources in most of lamp holders is relatively fixed, and thus, the center light intensity of emitted light of the table lamps is not changed. Under the situation that a target object is fixed, the center illuminance irradiating to the target object can be adjusted only by adjusting the positions of the lamp holders while the adjusting method is not convenient to operate.

SUMMARY

An objective of the present disclosure is to solve the above-mentioned problems and provide a zoom structure applied in the lamp holder, which is used to conveniently adjust the distance between the lens and the light source in the lamp holder.

To achieve the above objective, the disclosure provides a zoom structure, comprising a light source, a first sleeve, a second sleeve, a lens fixedly connected with the first sleeve and a limitation element. The zoom structure includes a center shaft and a circumference, the second sleeve and the first sleeve are coaxially arranged with the center shaft as an axis, the limitation element sleeves outer sides of the circumferences of the first sleeve and the second sleeve, the second sleeve is provided with a plurality of spiral sliding grooves, the first sleeve is provided with a plurality of sliding structures connected with the spiral sliding grooves, each of the sliding structures is in sliding connection with the limitation element in the axial direction, the second sleeve is rotationally connected with the limitation element in a circumferential direction, a position of the light source is fixed, the lens is opposite to the light source in the axial direction, and the second sleeve is rotatable relative to the limitation element in the circumferential direction, to enable the spiral sliding grooves to push the sliding structures to move on the limitation element in the axial direction, then to enable the sliding structures to drive the first sleeve and the lens to move in the axial direction, and to change a distance between the lens and the light source.

BRIEF DESCRIPTION OF THE DRAWINGS

The drawings described here are used to provide a further understanding of the disclosure and constitute a part of the disclosure. The schematic embodiments and descriptions of the disclosure are used to explain the disclosure and do not constitute an improper limitation of the disclosure, in which.

DETAILED DESCRIPTION

To make the objective, the technical solutions, and the advantages clearer, technical solutions of the disclosure will be described in a clearly and fully understandable way in connection with the specific embodiments and the drawings of the disclosure. It is apparent that the described embodiments are a part but not all of the embodiments of the disclosure. Based on the described embodiments herein, one of ordinary skill in the art can obtain other embodiment(s), without any creative work, which shall be within the scope of the disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
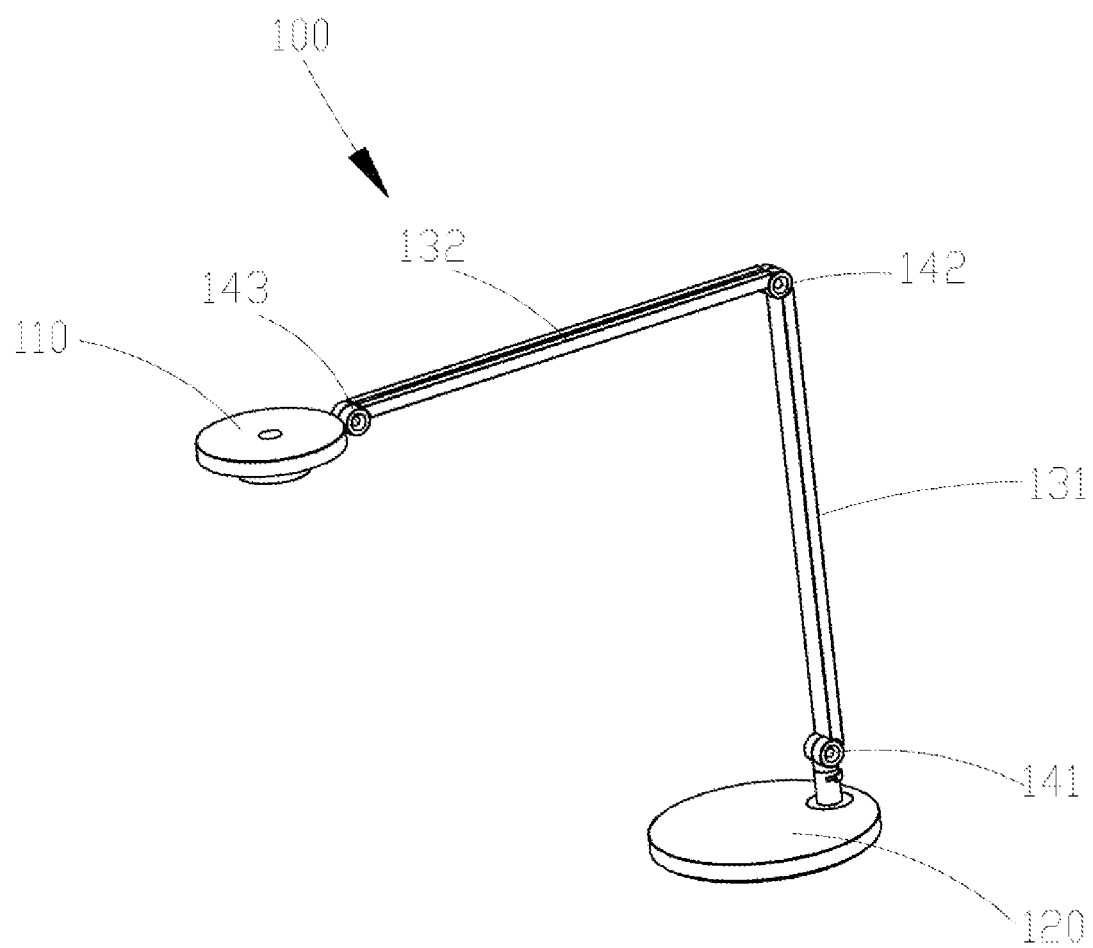
FIG. 1 is a perspective diagram of a lighting device provided in an embodiment of the disclosure.
Figure 2:
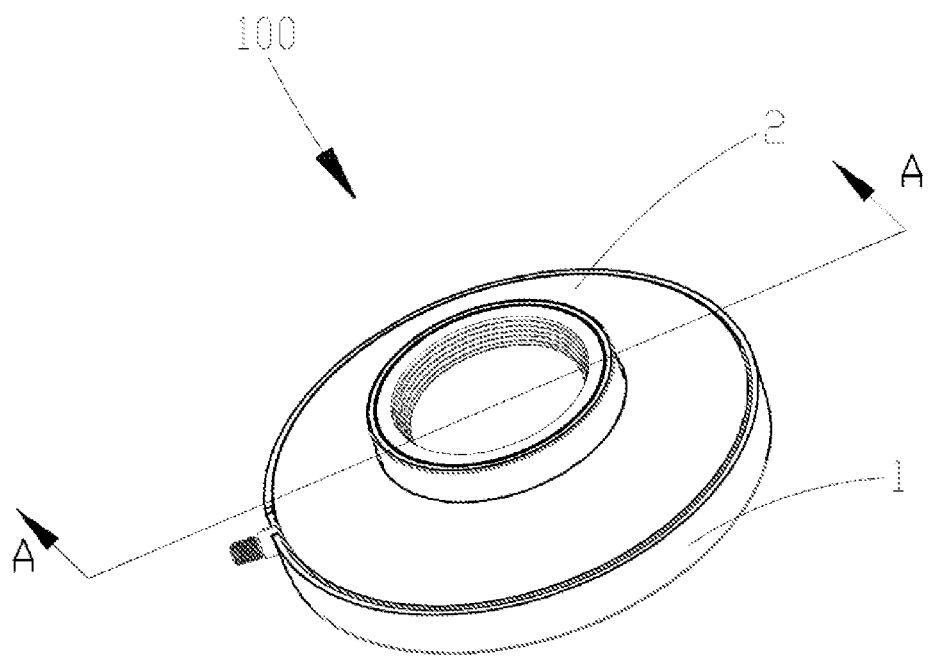
FIG. 2 is a perspective diagram of a lamp holder in the lighting device in FIG. 1.
Figure 3:
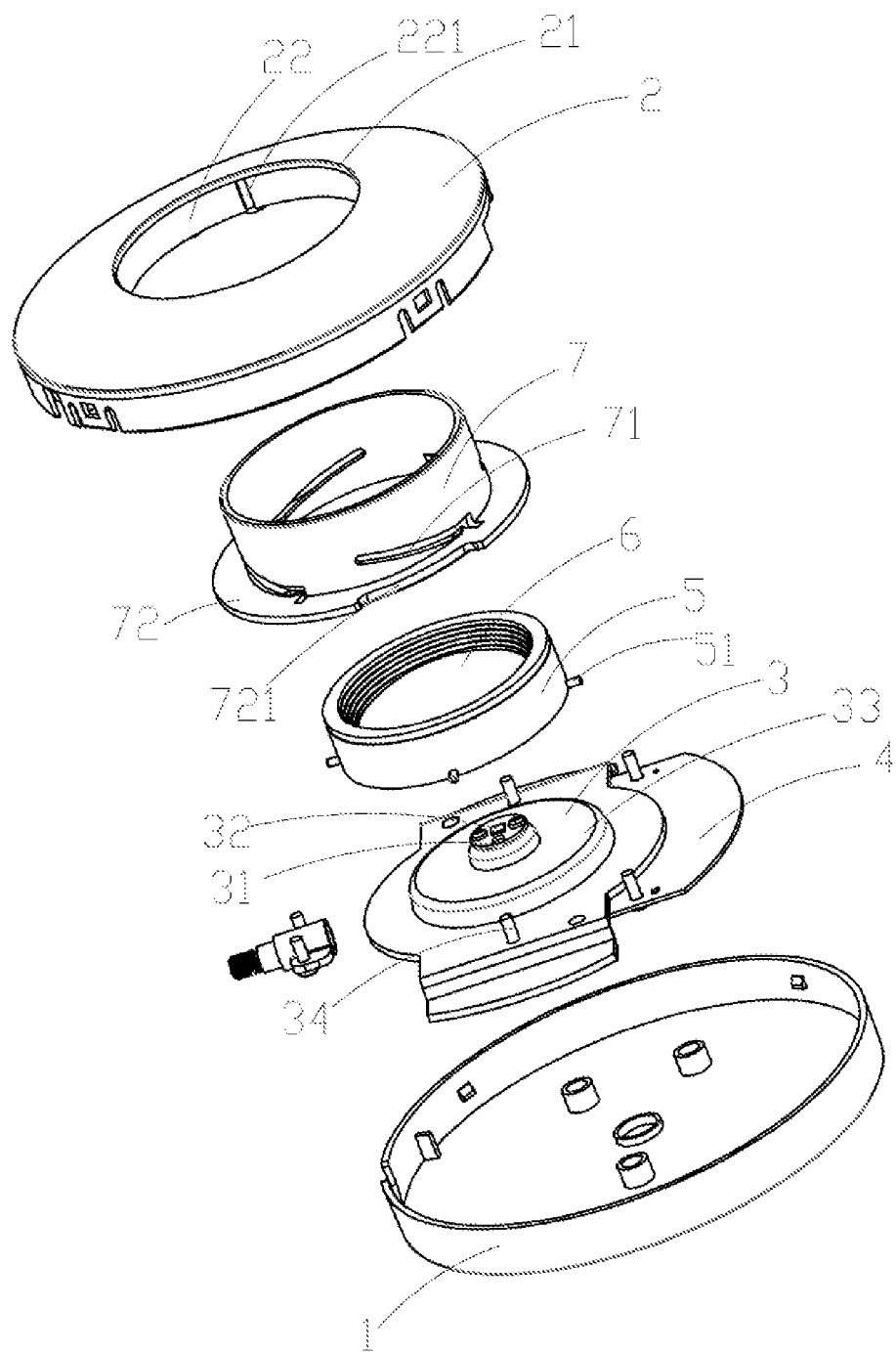
FIG. 3 is an exploded view of the lamp holder of FIG. 2.
Figure 4:
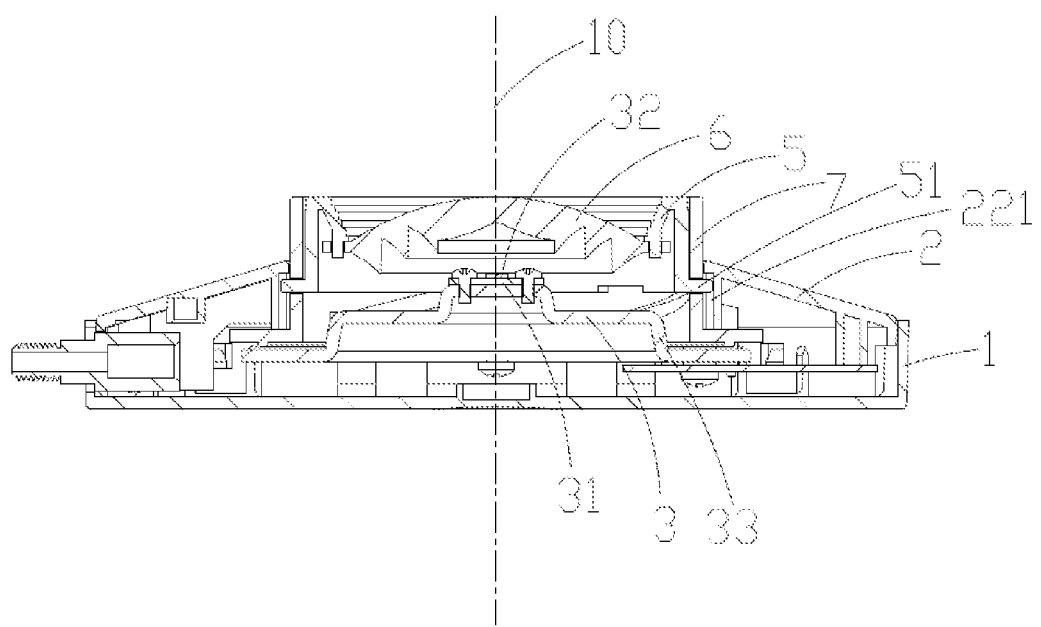
FIG. 4 is a cross-sectional view along an A-A line in FIG. 2.

As shown in FIG. 1-FIG. 4, the embodiment provides a lighting device 100 comprising a base 120, lamp arms 131,132, and a lamp holder 110, and the lamp arms 131,132 connecting the lamp holder 110 and the base 120. Specifically, the lamp holder 110 comprises a shell 1, a cover body 2 connected with the shell 1, a light source module 3 and a power panel 4 fixed in the shell 1, a first sleeve 5 and a second sleeve 7 above the light source module 3, and a lens 6 fixedly connected with the first sleeve 5. Specifically, the lens 6 is opposite to the light source module 3 in the axial direction, the second sleeve 7 and the first sleeve 5 are coaxially arranged with a center shaft 10 as an axis, the cover body 2 sleeves the outer sides of circumferences of the first sleeve 5 and the second sleeve 7, the second sleeve 7 is provided with a plurality of spiral sliding grooves 71, the first sleeve 5 is provided with a plurality of sliding structures 51 connected with the spiral sliding grooves 71, the second sleeve 7 is rotatable in the circumferential direction, to enable the spiral sliding grooves 71 to push the sliding structures 51 to move on the inner circumference of the cover body in the axial direction, the sliding structures 51 then to drive the first sleeve 5 and the lens 6 to move in the axial direction, and to change the distance between the lens 6 and the light source module 3. The lighting device 100 can be applied to a table lamp.

The detailed description is made with respect to various elements and the connecting relations among various elements in the lighting device 100 provided in the preferable embodiment of the disclosure.

In the embodiment, the lighting device 100 comprises two lamp arms including a first lamp arm 131 and a second lamp arm 132, the first lamp arm 131 and the base 120 are connected through a first rotation shaft 141, the second lamp arm 132 and the first lamp arm 131 are connected through a second rotation shaft 142, and the lamp holder 110 and the second lamp arm 132 are connected through a third rotation shaft 143. Accordingly, the position of the lamp holder 110 can be flexibly adjusted.

An accommodation space is formed through connection of the shell 1 and the cover body 2, the light source module 3 and the power panel 4 are both fixed in the accommodation space, and the first sleeve 5 and the second sleeve 7 are located in the accommodation space and penetrate through the cover body 2 to extend outwards. A clamping connection manner or a screw connection manner or other connection manners can be adopted for the shell 1 and the cover body 2.

In the embodiment, the light source module 3 comprises a light source plate 31, a light source 32 arranged above the light source plate 31 and a heat dissipation member 33 connected below the light source plate 31. The light source 32 is an LED lamp bead or other light emitting elements. The heat dissipation member 33 is in a plate shape and is provided with a boss (not shown) for disposing the light source plate 31, and the light source plate 31 and the power panel 4 are connected to the upper side and the lower side of the heat dissipation member 33, respectively. The lamp holder 110 further comprises a positioning column 34 fixedly connected with the light source module 3. In other alternative embodiments, the heat dissipation member 33 may be omitted under the situation that the heat dissipation requirement is not high.

The first sleeve 5 is in a ring shape, the lens 6 is fixedly connected to the inner side of the circumference of the first sleeve 5, and a clamping connection manner, a screw connection manner and other connection manners can be adopted between the lens 6 and the first sleeve 5. The part, located above the lens 6, of the inner side of the circumference of the first sleeve 5 is further provided with a spiral structure (not shown) for decoration. The outer side of the circumference of the first sleeve 5 is provided with a plurality of sliding structures 51 which are evenly arranged on the first sleeve 5 in the circumferential direction, and in the embodiment, the sliding structures 51 are circular protruding strips.

The lens 6 is opposite to the light source module 3 in the axial direction and covers the light source 31. In one embodiment, the outer surface of the lens 6 is a smooth curved face, the inner surface of the lens 6 is in a zigzag shape, but the face type of the lens 6 is not limited to this face type.

The second sleeve 7 is in a ring shape and sleeves the outer side of the circumference of the first sleeve 5. The second sleeve 7 is provided with a plurality of spiral sliding grooves 71 which are evenly arranged in the second sleeve 7 in the circumferential direction. In the embodiment, the sliding structures 51 are in one-to-one correspondence with the spiral sliding grooves 71, and the sliding structures 51 penetrate through the spiral sliding grooves 71 in the radial direction and are clamped in the spiral sliding grooves 71. In the embodiment, the lower portion of the second sleeve 7 is further fixedly connected with the base 72 provided with an arc notch 721, and the positioning column 34 is fixedly connected to the heat dissipation member 33 and extends into the notch 721 in the axial direction.

The cover body 2 serves as a limitation element and is provided with a through hole 21. The cover body 2 sleeves the outer sides of the circumferences of the first sleeve 5 and the second sleeve 7 through the through hole 21, the first sleeve 5 and the cover body 2 are in sliding connection in the axial direction, and the second sleeve 7 is rotationally connected with the cover body 2 in the circumferential direction. In the embodiment, the through hole 21 is provided with a side wall 22 extending in the axial direction, the second sleeve 7 is sandwiched between the first sleeve 5 and the side wall 22, the side wall 22 is provided with a limiting groove 221 extending in the axial direction, the sliding structures 51 penetrate through the spiral sliding grooves 71 and extend to the limiting groove 221, and the limiting groove 221 limits the sliding structures 51 to only move up and down in the axial direction. In other alternative embodiments, the first sleeve 5 can sleeve the outer side of the circumference of the second sleeve 7, i.e., the first sleeve 5 is sandwiched between the second sleeve 7 and the side wall 22.

When the center light intensity of emitted light of the lamp holder 110 needs to be adjusted, the second sleeve 7 rotates in the circumferential direction, the spiral sliding grooves 72 push the sliding structures 51 to move in the axial direction, the sliding structures 51 then drive the first sleeve 5 and the lens 6 to move in the axial direction and change the distance between the lens 6 and the light source module 3. In other words, the rotation movement of the second sleeve 7 is converted into the linear movement of the first sleeve 5. The rotation angle of the second sleeve 7 is limited by the positioning column 34, specifically, the second sleeve 7 can rotate clockwise or counterclockwise to the end of the notch 721 to abut against the positioning column 34, and at this time, the position is the maximum orientation for the rotation of the second sleeve 7.

In the lighting device 100 of the disclosure, the lamp holder 110 of the lighting device 100 is provided with the cover body 2 which serves as the limitation element to limit the first sleeve 5 to only move in the axial direction, the first sleeve 5 is driven to move by rotating the second sleeve 7, the rotation movement is changed into the linear movement, accordingly, the distance between the lens 6 and the light source module 3 is adjusted, and the center light intensity of the emitted light of the lamp holder 110 is adjusted by zooming operation. The operation manner is convenient and saves labor, the center illuminance irradiating to the target object can be adjusted by directly adjusting the center light intensity of the emitted light of the lamp holder 110, and the operation performance of the lighting device 100 is improved.

Additionally or alternatively, the plurality of spiral sliding grooves are evenly arranged in the second sleeve in the circumferential direction.

Additionally or alternatively, the sliding structures are protruding strips.

Additionally or alternatively, the limitation element is provided with a through hole, and the limitation element sleeves the outer sides of the circumference of the first sleeve and the second sleeve through the through hole.

Additionally or alternatively, the limitation element comprises the limiting groove extending in the axial direction, and the sliding structures penetrate through the spiral sliding grooves to extend to the limiting groove.

Additionally or alternatively, the zoom structure further comprises a base fixedly connected with the second sleeve and a positioning column fixedly connected with the light source module, the base is provided with an arc notch, and the positioning column extends into the arc notch in the axial direction.

Additionally or alternatively, the light source module comprises a light source plate, the light source arranged above the light source plate and a heat dissipation member connected below the light source plate.

Additionally or alternatively, the heat dissipation member is attached below the light source plate, and the positioning column is fixedly connected to the heat dissipation member.

To achieve the above objective, the disclosure also provides a lamp holder, comprising a shell and the zoom structure, an accommodation space is formed by connection of the shell and the limitation element, and the light source module is accommodated in the accommodation space.

Additionally or alternatively, the limitation element is provided with a through hole, the through hole is provided with a side wall extending in the axial direction, and the second sleeve is sandwiched between the first sleeve and the side wall.

Additionally or alternatively, the side wall is provided with the limiting groove extending in the axial direction, and the sliding structures penetrate through the spiral sliding grooves to extend to the limiting groove.

Additionally or alternatively, the light source comprises the light source plate, the light source arranged on the light source plate and the heat dissipation member connected with the light source plate, the lamp holder further comprise a power panel, and the power panel is connected with the heat dissipation member.

To achieve the above objective, the disclosure also provides a lighting device, comprising a base, lamp arms and the lamp holder, and the lamp arms connect the lamp holder and the base.

Additionally or alternatively, the base and one lamp arm are connected through a rotation shaft, and another lamp arm and the lamp holder are connected through another rotation shaft.

Additionally or alternatively, the lighting device comprises at least two lamp arms, and the two lamp arms are connected through a rotation shaft.

Compared with the prior art, the zoom structure provided by the present disclosure is provided with a limiting element to restrict the first sleeve to move only in the axial direction, and the first sleeve is driven to move by rotating the second sleeve, so as to change the rotation to a linear movement to adjust the distance between the lens and the light source module, thereby adjusting the central light intensity of the output light of the zoom structure. This operation mode is convenient and labor-saving. When this zoom structure is applied to the lighting device, the central illuminance of the target object can be directly adjusted by adjusting the central light intensity of the emitted light, which improves the operating performance of the lighting device.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the application focus on the differences between the examples. The different optimization features between the examples can be combined to form a better example as long as the different optimization features between the examples are not contradictory, which will not be repeated here for conciseness.

What are described above is related to the examples of the present disclosure only and not limitative to the present disclosure. Various modification and change may be made by those skilled in the art. Any modification, equivalent replacement and modification made within the spirit and principle of the present disclosure are regarded as falling within the protection scope of the present disclosure.

The specific examples described above further describe the objective, technical solutions and beneficial effects of the present disclosure in detail. It is to be understood that the above descriptions are only specific embodiments of the present disclosure and are not intended to limit the present disclosure. Any modification, equivalent replacement, improvement, etc. made within the spirit and principle of the disclosure shall be included in the scope of the disclosure.

What is claimed is:

1. A lighting device, comprising a lamp base, lamp arms, and a lamp holder,
    wherein the lamp holder comprises: a zoom structure, comprising a light source module, a first sleeve, a second sleeve, a limitation element, and a lens fixedly connected with the first sleeve a center shaft, and a circumference,
    wherein the first sleeve and the second sleeve are coaxially arranged with the center shaft as an axis, the limitation element sleeves outer sides of the circumferences of the first sleeve and the second sleeve;
    wherein the first sleeve is in sliding connection with the limitation element in the axial direction, the second sleeve is rotationally connected with the limitation element in a circumferential direction;
    wherein the second sleeve is provided with a plurality of spiral sliding grooves, the first sleeve is provided with a plurality of sliding structures connected with the spiral sliding grooves;
    wherein a position of the light source module is fixed, the lens is opposite to the light source module in the axial direction;
    wherein the second sleeve is rotatable relative to the limitation element in the circumferential direction, to enable the spiral sliding grooves to push the sliding structures to move on the limitation element in the axial direction, then to enable the sliding structures to drive the first sleeve and the lens to move in the axial direction, and to change a distance between the lens and the light source module;
    wherein the lamp arms connect the lamp holder and the lamp base; and
    wherein at least two lamp arms are directly connected through a rotation shaft.

2. The lighting device according to the claim 1, wherein the plurality of spiral sliding grooves are evenly arranged in the second sleeve in the circumferential direction.

3. The lighting device according to the claim 1, wherein the sliding structures are protruding strips.

4. The lighting device according to the claim 1, wherein the limitation element is provided with a through hole, and the limitation element sleeves the outer sides of the circumference of the first sleeve and the second sleeve through the through hole.

5. The lighting device according to the claim 1, wherein the limitation element comprises the limiting groove extending in the axial direction, and the sliding structures penetrate through the spiral sliding grooves to extend to the limiting groove.

6. The lighting device according to the claim 1, characterized by further comprising a base fixedly connected with the second sleeve and a positioning column fixedly connected with the light source module, the base is provided with an arc notch, and the positioning column extends into the arc notch in the axial direction.

7. The lighting device according to the claim 6, wherein the light source module comprises a light source plate, a light source arranged above the light source plate and a heat dissipation member connected below the light source plate.

8. The lighting device according to the claim 7, wherein the heat dissipation member is attached below the light source plate, and the positioning column is fixedly connected to the heat dissipation member.

9. The lighting device according to claim 1, further comprising a shell wherein an accommodation space is formed by connection of the shell and the limitation element, and the light source module is accommodated in the accommodation space.

10. The lighting device according to the claim 9, wherein the limitation element is provided with a through hole, the through hole is provided with a side wall extending in the axial direction, and the second sleeve is sandwiched between the first sleeve and the side wall.

11. The lighting device according to the claim 10, wherein the side wall is provided with the limiting groove extending in the axial direction, and the sliding structures penetrate through the spiral sliding grooves to extend to the limiting groove.

12. The lighting device according to the claim 9, wherein the light source module comprises the light source plate, a light source arranged on the light source plate and a heat dissipation member connected with the light source plate, the lamp holder further comprise a power panel, and the power panel is connected with the heat dissipation member.

13. The lighting device according to the claim 1, wherein the base and one lamp arm are connected through a rotation shaft, and another lamp arm and the lamp holder are connected through another rotation shaft.

* * * * *